US007890670B2

(12) United States Patent
Archer et al.

(10) Patent No.: US 7,890,670 B2
(45) Date of Patent: Feb. 15, 2011

(54) DIRECT MEMORY ACCESS TRANSFER COMPLETION NOTIFICATION

(75) Inventors: Charles J. Archer, Rochester, MN (US); Michael A. Blocksome, Rochester, MN (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 11/746,348

(22) Filed: May 9, 2007

(65) Prior Publication Data

US 2008/0281998 A1 Nov. 13, 2008

(51) Int. Cl.
G06F 13/28 (2006.01)
G06F 12/00 (2006.01)
(52) U.S. Cl. .................. 710/22; 710/30; 710/53; 719/318; 711/169; 711/170; 714/48
(58) Field of Classification Search ............. None
See application file for complete search history.

(56) References Cited

U.S. PATENT DOCUMENTS

| | | | |
|---|---|---|---|
| 4,933,846 A | 6/1990 | Humphrey et al. | |
| 5,136,582 A | 8/1992 | Firoozmand | |
| 5,448,698 A | 9/1995 | Wilkes | |
| 5,689,509 A | 11/1997 | Gaytan et al. | |
| 5,758,075 A | 5/1998 | Graziano et al. | |
| 5,796,735 A | 8/1998 | Miller et al. | |
| 5,802,366 A | 9/1998 | Row et al. | |
| 5,961,659 A | 10/1999 | Benner | |
| 6,161,198 A | 12/2000 | Hill et al. | |
| 6,356,951 B1 * | 3/2002 | Gentry, Jr. | 709/250 |
| 6,711,632 B1 | 3/2004 | Chow et al. | |
| 6,735,662 B1 | 5/2004 | Conner | |
| 6,744,765 B1 | 6/2004 | Dearth et al. | |
| 6,754,732 B1 | 6/2004 | Dixon et al. | |
| 6,857,030 B2 | 2/2005 | Webber | |
| 6,977,894 B1 | 12/2005 | Achilles et al. | |
| 6,981,074 B2 | 12/2005 | Oner et al. | |

(Continued)

OTHER PUBLICATIONS

Office Action Dated Oct. 14, 2008 in U.S. Appl. No. 11/754,719.

(Continued)

Primary Examiner—Tariq Hafiz
Assistant Examiner—Dean Phan
(74) Attorney, Agent, or Firm—Biggers & Ohanian, LLP

(57) ABSTRACT

DMA transfer completion notification includes: inserting, by an origin DMA engine on an origin node in an injection first-in-first-out ('FIFO') buffer, a data descriptor for an application message to be transferred to a target node on behalf of an application on the origin node; inserting, by the origin DMA engine, a completion notification descriptor in the injection FIFO buffer after the data descriptor for the message, the completion notification descriptor specifying a packet header for a completion notification packet; transferring, by the origin DMA engine to the target node, the message in dependence upon the data descriptor; sending, by the origin DMA engine, the completion notification packet to a local reception FIFO buffer using a local memory FIFO transfer operation; and notifying, by the origin DMA engine, the application that transfer of the message is complete in response to receiving the completion notification packet in the local reception FIFO buffer.

18 Claims, 7 Drawing Sheets

U.S. PATENT DOCUMENTS

| | | | |
|---|---|---|---|
| 7,031,305 | B1 | 4/2006 | Yu et al. |
| 7,111,092 | B1 | 9/2006 | Mitten et al. |
| 2004/0057380 | A1 | 3/2004 | Biran et al. |
| 2004/0078405 | A1 | 4/2004 | Bhanot et al. |
| 2004/0218631 | A1 | 11/2004 | Ganfield |
| 2006/0230119 | A1 | 10/2006 | Hausauer et al. |
| 2007/0165672 | A1 | 7/2007 | Keels et al. |
| 2008/0273543 | A1 | 11/2008 | Blocksome et al. |

OTHER PUBLICATIONS

Office Action Dated Mar. 4, 2009 in U.S. Appl. No. 11/754,719.
Office Action Dated Nov. 21, 2008 in U.S. Appl. No. 11/758,167.
Office Action Dated Aug. 20, 2009 in U.S. Appl. No. 11/744,296.
Office Action Dated Sep. 2, 2009 in U.S. Appl. No. 11/746,348.
Final Office Action Dated Apr. 24, 2009 in U.S. Appl. No. 11/758,167.
Final Office Action Dated Aug. 5, 2009 in U.S. Appl. No. 11/754,719.
Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.
Notice of Allowance, U.S. Appl. No. 11/754,719, mailed Apr. 6, 2010.
Office Action, U.S. Appl. No. 11/744,319, mailed May 12, 2010.
Office Action, U.S. Appl. No. 11/829,317, mailed May 26, 2010.
Notice of Allowance Dated Apr. 6, 2010 in U.S. Appl. No. 11/754,719.
Final Office Action Dated Feb. 23, 2010 in U.S. Appl. No. 11/746,348.
Final Office Action Dated Feb. 24, 2010 in U.S. Appl. No. 11/744,296.
Notice of Allowance Dated Mar. 12, 2010 in U.S. Appl. No. 11/758,167.

\* cited by examiner

DIRECT MEMORY ACCESS TRANSFER COMPLETION NOTIFICATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for DMA transfer completion notification.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

When a parallel application running on a compute node transmits a message to another compute node connected to the data communications network, the application typically provides messaging software with a pointer to an application buffer storing the message. The messaging software describes the message in the application buffer to a direct memory access ('DMA') engine, which in turn, sends the message through the network using a DMA transfer operation. When notified by the DMA engine that the transfer is complete, the application frees up the application buffer for use with another operation and continues with its flow of execution. The drawback to current methods used by the DMA engine to notify the application that the transfer is complete is that the DMA engine must typically wait for an acknowledgement message from the compute node receiving the transfer before notifying the application that the transfer is complete. Waiting for an acknowledgement message from the compute node that received the transfer often introduces additional latency penalties when processing the application. As such, readers will appreciate that room for improvement exists in current DMA transfer completion notification.

SUMMARY OF THE INVENTION

Methods, apparatus, and products are disclosed for Direct Memory Access ('DMA') transfer completion notification that include: inserting, by an origin DMA engine on an origin compute node in an injection first-in-first-out ('FIFO') buffer, a data descriptor for an application message to be transferred to a target compute node on behalf of an application on the origin compute node; inserting, by the origin DMA engine, a completion notification descriptor in the injection FIFO buffer after the data descriptor for the application message, the completion notification descriptor specifying a packet header for a completion notification packet; transferring, by the origin DMA engine to the target compute node, the application message in dependence upon the data descriptor; sending, by the origin DMA engine, the completion notification packet to a local reception FIFO buffer using a local memory FIFO transfer operation; and notifying, by the origin DMA engine, the application that transfer of the application message is complete in response to receiving the completion notification packet in the local reception FIFO buffer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
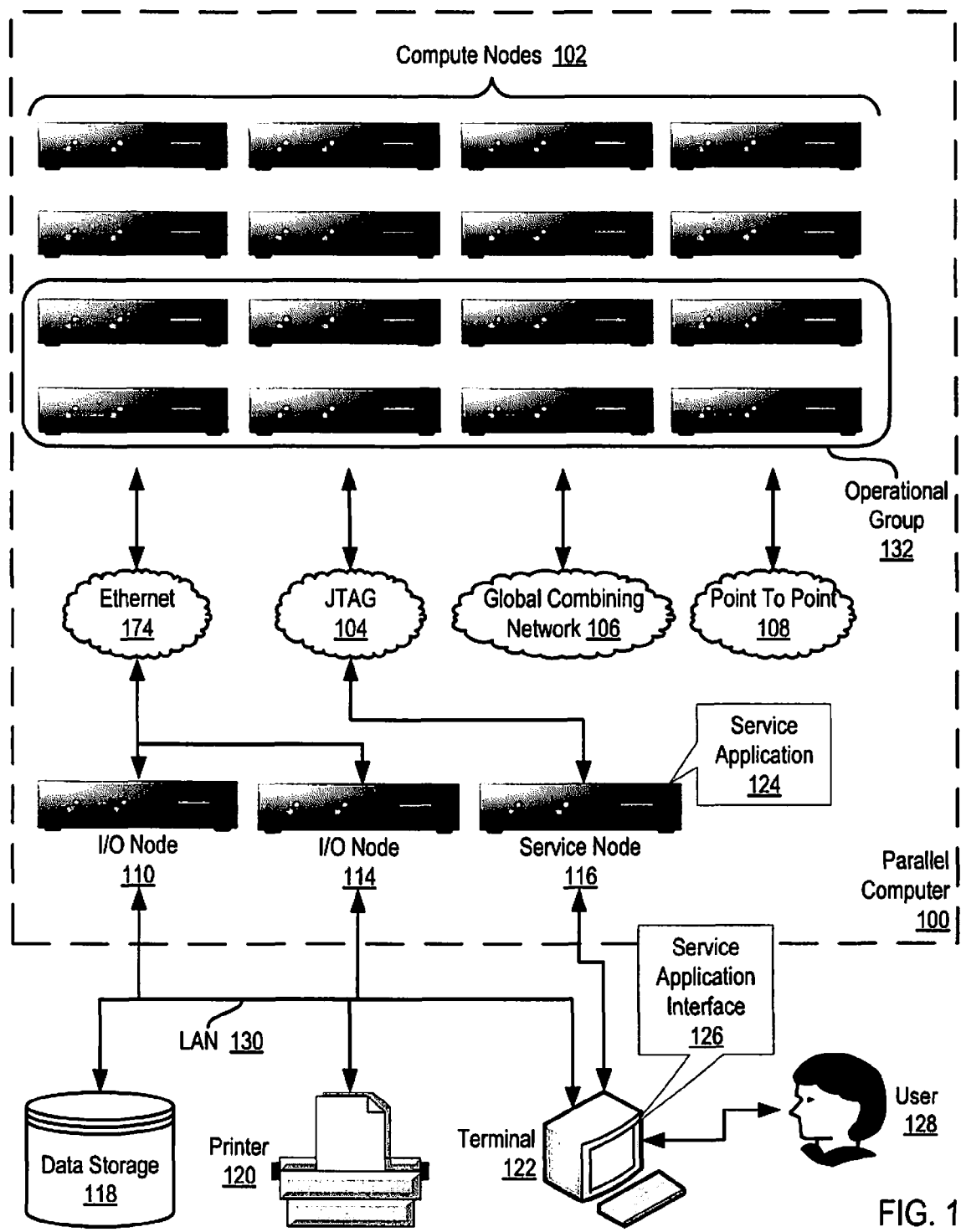
FIG. 1 illustrates an exemplary system for DMA transfer completion notification according to embodiments of the present invention.

Exemplary methods, apparatus, and computer program products for DMA transfer completion notification according to embodiments of the present invention are described with reference to the accompanying drawings, beginning with FIG. 1. FIG. 1 illustrates an exemplary system for DMA transfer completion notification according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for DMA transfer completion notification according to embodiments of the present invention. The system of FIG. 1 operates generally for DMA transfer completion notification according to embodiments of the present invention as follows: An origin DMA engine on an origin compute node inserts, in an injection first-in-first-out ('FIFO') buffer, a data descriptor for an application message to be transferred to a target compute node on behalf of an application on the origin compute node. Readers will note that the origin compute node is a compute node attempting to transmit a message, while the target compute node is a compute node intended as the recipient of the message. A data descriptor is a data structure that describes a message for transmission and specifies transmission data related to the message. For example, a data descriptor may describe the address of the buffer storing the message and the size of the message and may specify the particular message type of the message and the packet headers to be used in transmitting the message. The data descriptor specifies a data transfer operation for transferring the application message to the target compute node. The origin DMA engine then inserts a completion notification descriptor in the injection FIFO buffer after the data descriptor for the application message. A completion notification descriptor is a special type of data descriptor specifying a DMA data transfer operation carried out locally on the origin compute node to notify the application that the transfer is complete. The completion notification descriptor also specifies a packet header for a completion notification packet. The origin DMA engine transfers the application message to the target compute node in dependence upon the data descriptor. The origin DMA engine sends the completion notification packet to a local reception FIFO buffer using a local memory FIFO transfer operation. The origin DMA engine then notifies the application that transfer of the application message is complete in response to receiving the completion notification packet in the local reception FIFO buffer.

A memory FIFO data transfer operation is a mode of transferring data using DMA engines, typically a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor. The local memory FIFO transfer operation is a memory FIFO data transfer operation for which the origin compute node and the target compute node are the same compute node. That is, a compute node transfers data to itself in a local memory FIFO transfer operation.

The arrangement of nodes, networks, and I/O devices making up the exemplary system illustrated in FIG. 1 are for explanation only, not for limitation of the present invention. Data processing systems capable of DMA transfer completion notification according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of DMA transfer completion notification according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

DMA transfer completion notification according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of DMA transfer completion notification according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
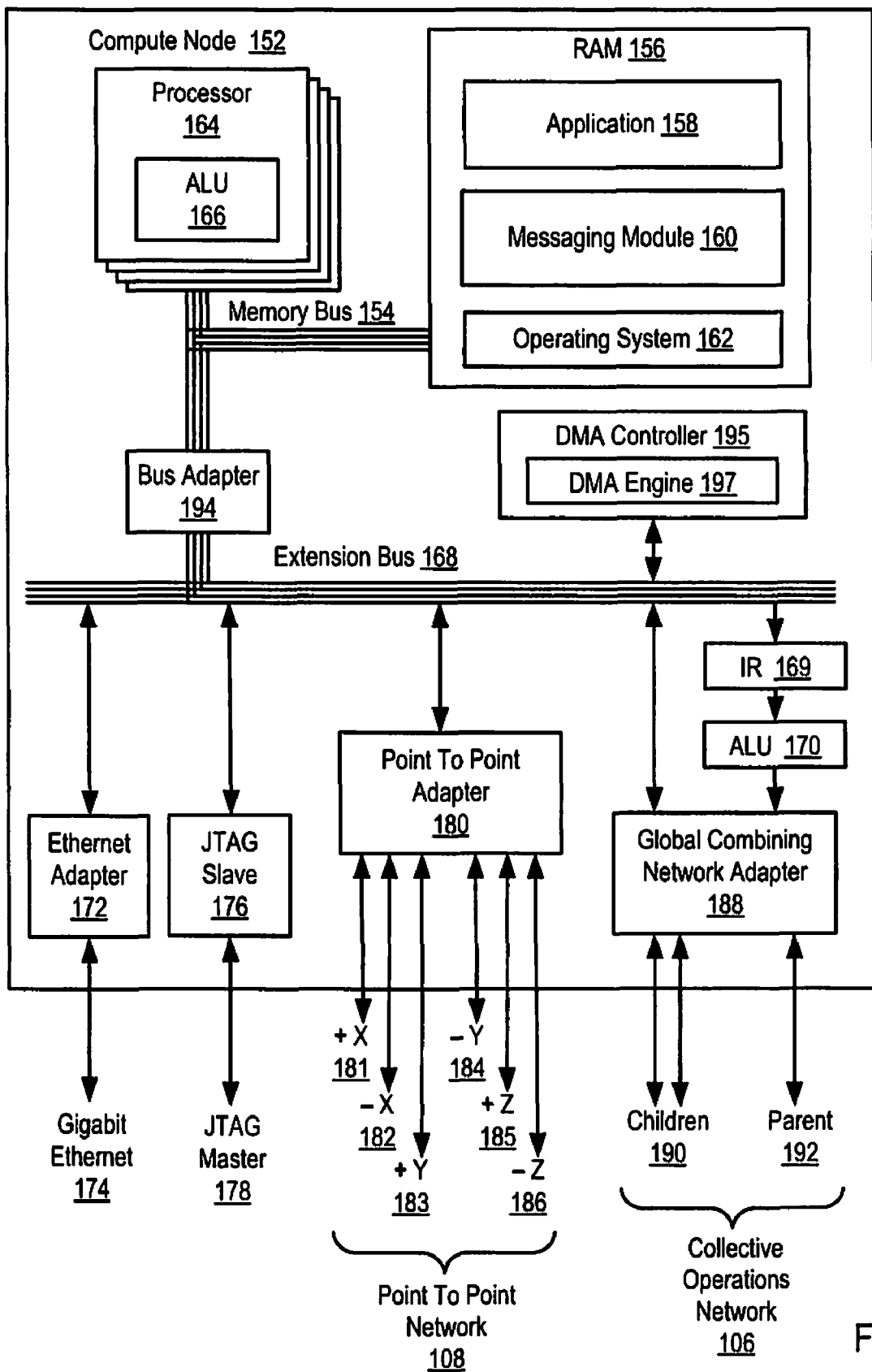
FIG. 2 sets forth a block diagram of an exemplary compute node useful in a parallel computer capable of DMA transfer completion notification according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for DMA transfer completion notification according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in DMA transfer completion notification according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it. The DMA engine (197) of FIG. 2 is improved for DMA transfer completion notification according to embodiments of the present invention. The DMA engine (197) of FIG. 2 operates generally for DMA transfer completion notification according to embodiments of the present invention by: inserting, in an injection first-in-first-out ('FIFO') buffer, a data descriptor for an application message to be transferred to a target compute node on behalf of the application (158) on the origin compute node; inserting a completion notification descriptor in the injection FIFO buffer after the data descriptor for the application message, the completion notification descriptor specifying a packet header for a completion notification packet; transferring, to the target compute node, the application message in dependence upon the data descriptor; sending the completion notification packet to a local reception FIFO buffer using a local memory FIFO transfer operation; and notifying the application (158) that transfer of the application message is complete in response to receiving the completion notification packet in the local reception FIFO buffer.

Figure 3A:
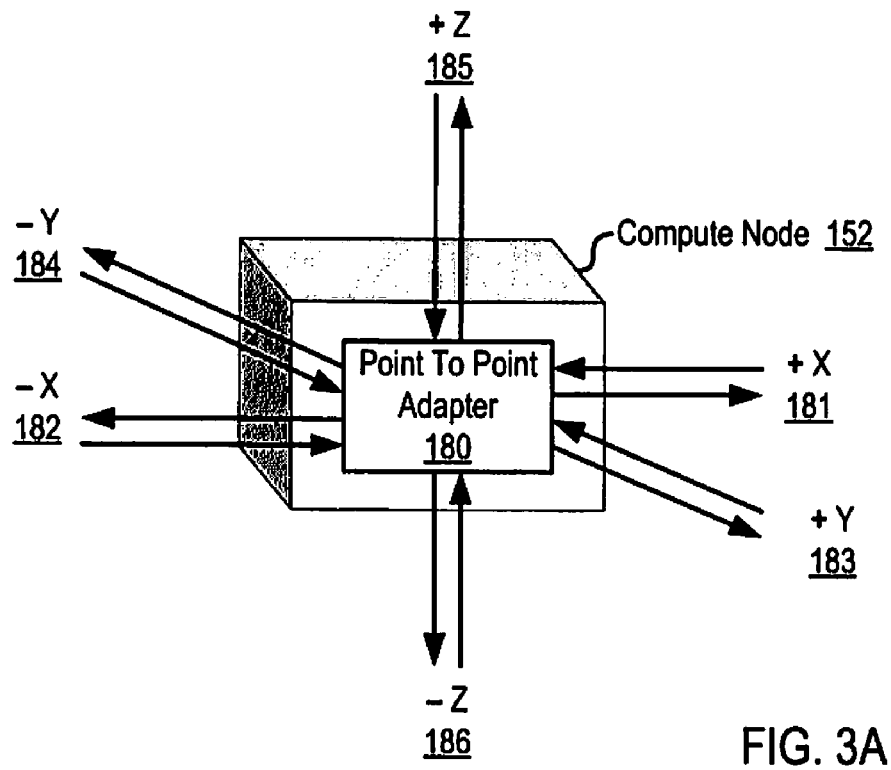
FIG. 3A illustrates an exemplary Point To Point Adapter useful in systems capable of DMA transfer completion notification according to embodiments of the present invention.

For further explanation, FIG. 3A illustrates an exemplary Point To Point Adapter (180) useful in systems capable of DMA transfer completion notification according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
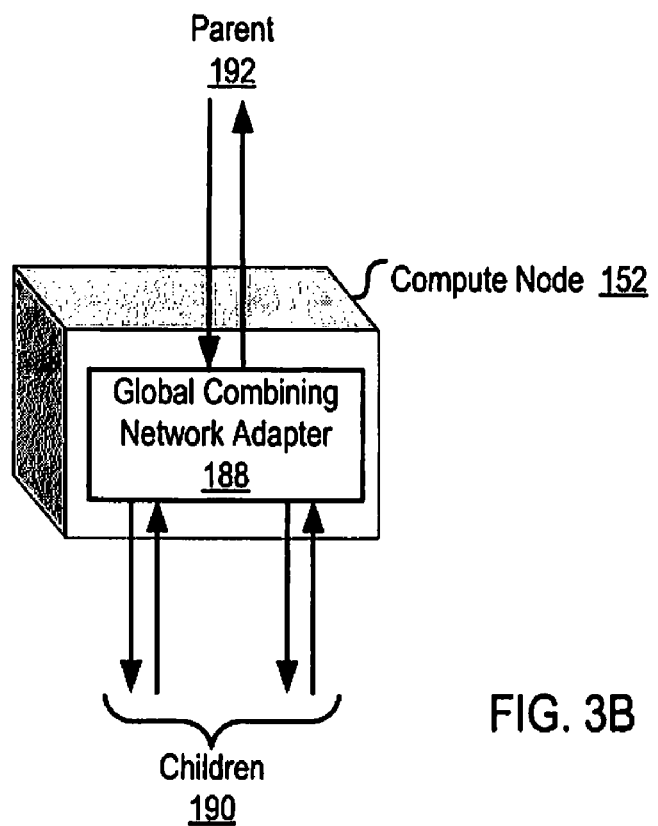
FIG. 3B illustrates an exemplary Global Combining Network Adapter useful in systems capable of DMA transfer completion notification according to embodiments of the present invention.

For further explanation, FIG. 3B illustrates an exemplary Global Combining Network Adapter (188) useful in systems capable of DMA transfer completion notification according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
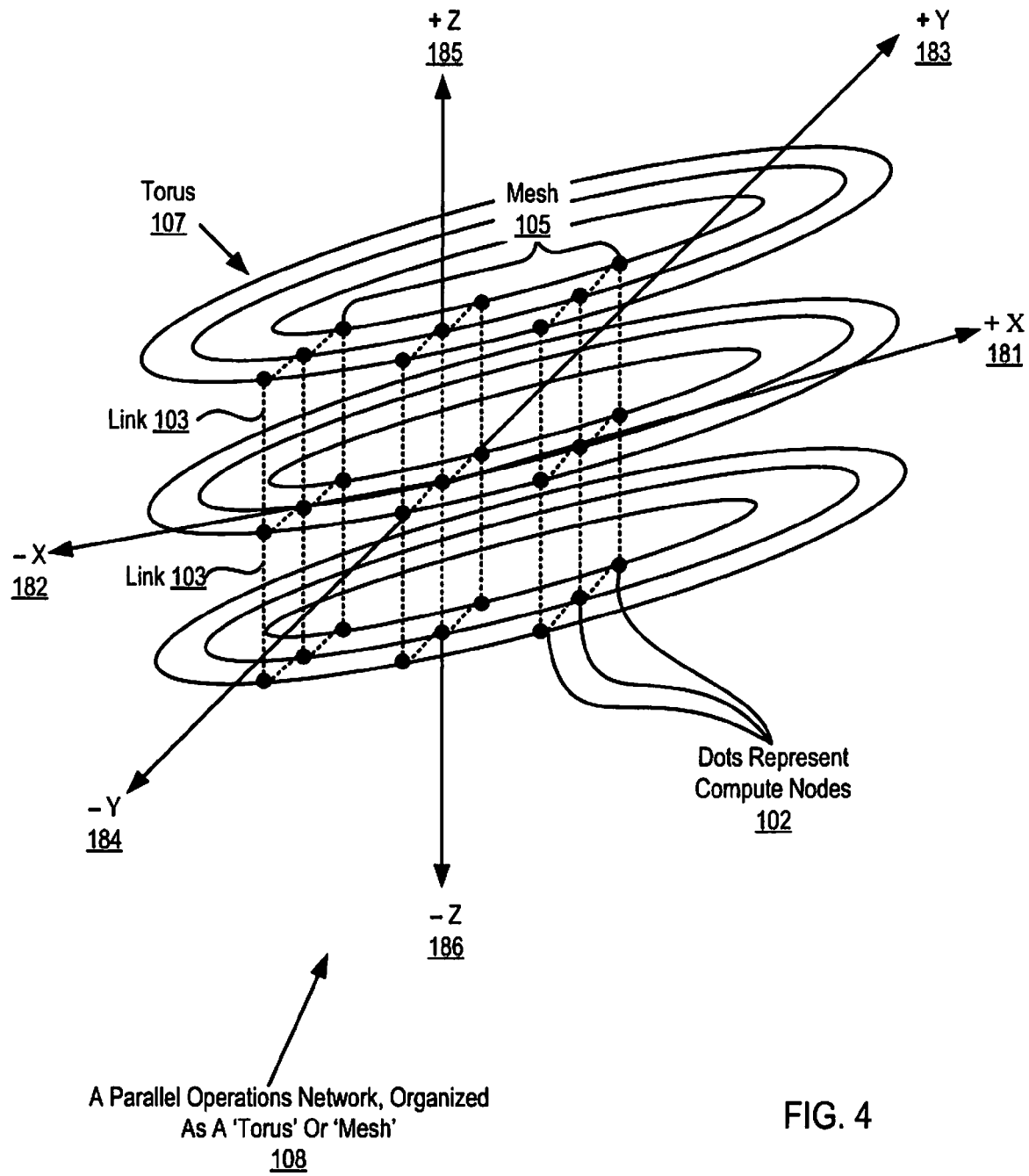
FIG. 4 sets forth a line drawing illustrating an exemplary data communications network optimized for point to point operations useful in systems capable of DMA transfer completion notification in accordance with embodiments of the present invention.

For further explanation, FIG. 4 sets forth a line drawing illustrating an exemplary data communications network (108) optimized for point to point operations useful in systems capable of DMA transfer completion notification in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in DMA transfer completion notification in accordance with embodiments of the present invention may contain only a few compute nodes or may contain thousands of compute nodes.

Figure 5:
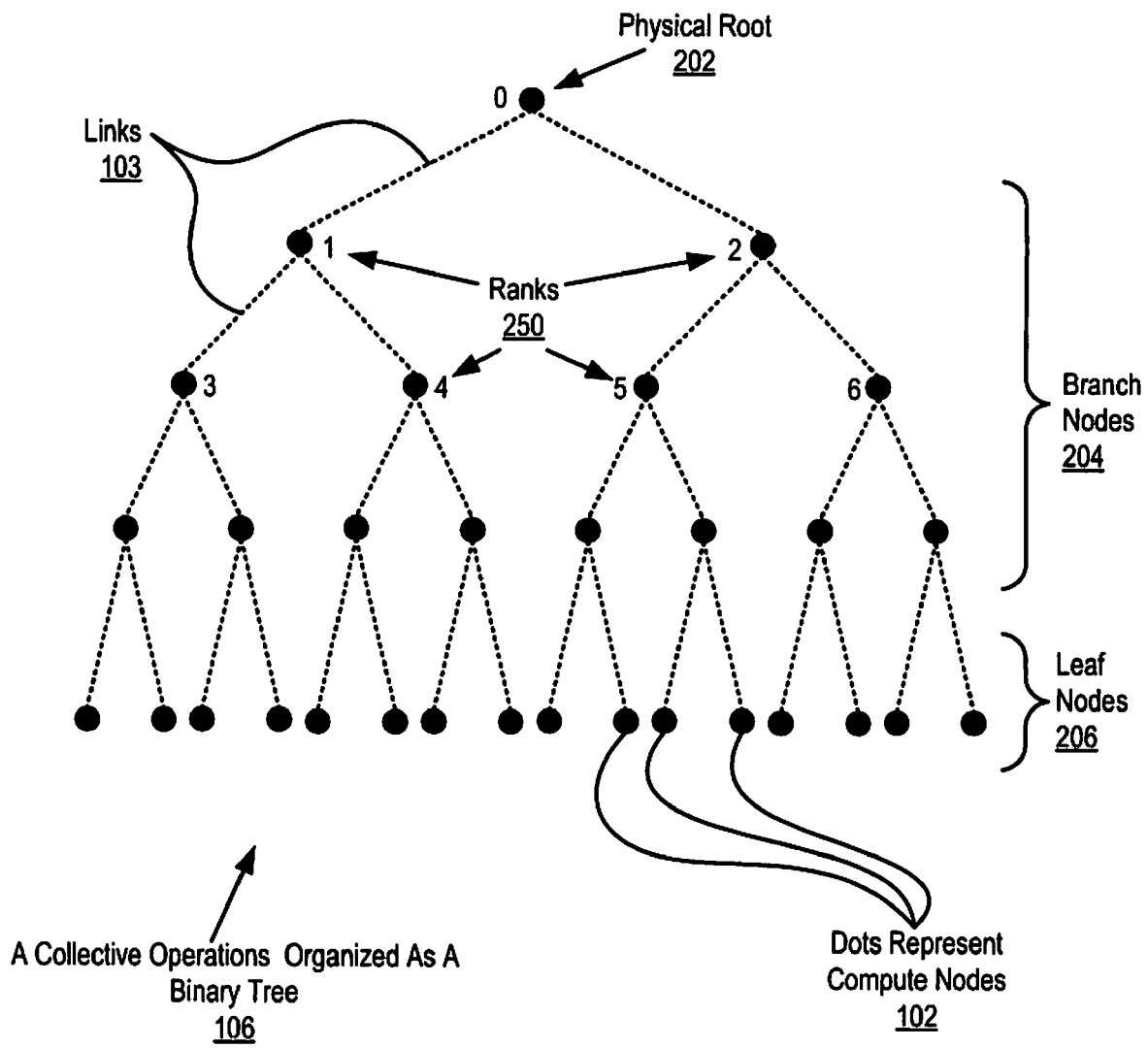
FIG. 5 sets forth a line drawing illustrating an exemplary data communications network optimized for collective operations useful in systems capable of DMA transfer completion notification in accordance with embodiments of the present invention.

For further explanation, FIG. 5 sets forth a line drawing illustrating an exemplary data communications network (106) optimized for collective operations useful in systems capable of DMA transfer completion notification in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for DMA transfer completion notification accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
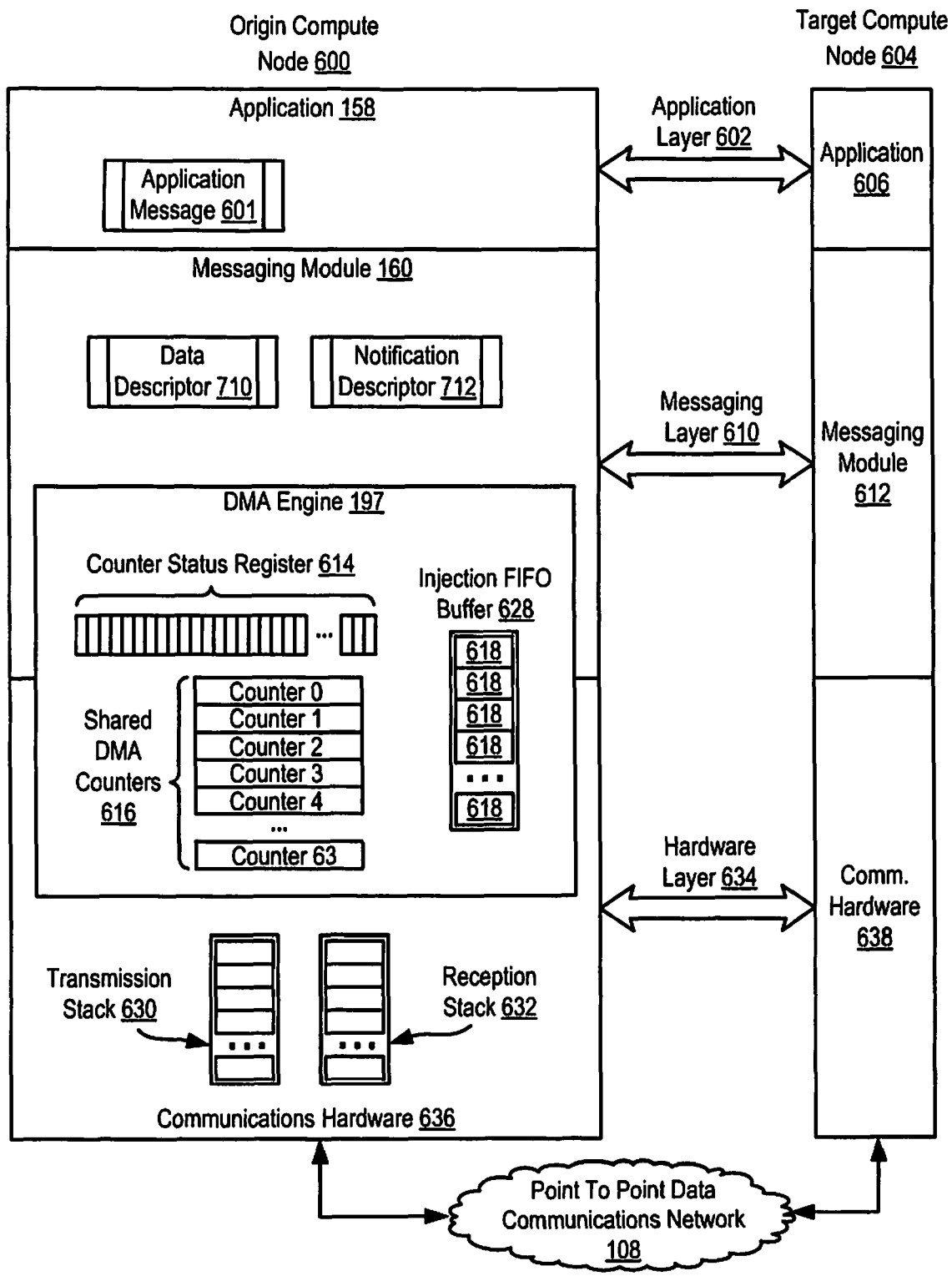
FIG. 6 sets forth a block diagram illustrating an exemplary communications architecture illustrated as a protocol stack useful in DMA transfer completion notification according to embodiments of the present invention.

For further explanation, FIG. 6 sets forth a block diagram illustrating an exemplary communications architecture illustrated as a protocol stack useful in DMA transfer completion notification according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, DMA transfer completion notification according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the application (158) on the origin compute node (600) has an application message (601) for transmission to the application (606) on the target compute node (604). Data communications between applications (158, 606) are effected using messaging modules (160, 612) installed on each of the compute nodes (600, 604). Applications (158 and 606) may communicate by invoking function of an application programming interfaces ('API') exposed by the application messaging modules (606 and 612). To transmit message (601) to the application (606), the application (158) of FIG. 6 may invoke a function of an API for messaging module (160) that passes a buffer identifier of an application buffer containing the application message (601) to the messaging module (160).

The exemplary communications architecture of FIG. 6 includes a messaging layer (610) that implements data communications protocols for data communications that support messaging in the application layer (602). In the example of FIG. 6, the messaging layer (610) is composed of messaging module (160) installed on the origin compute node (600) and messaging module (612) installed on the target compute node (604) and the messaging modules care capable of operating with DMA transfer completion notification according to embodiments of the present invention.

Such data communications protocols are typically invoked through a set of APIs that are exposed to the applications (158 and 606) in the application layer (602). When an application invokes an API for the messaging module, the messaging module (160) of FIG. 6 receives the buffer identifier from the application (158) through the messaging module's API exposed to the application (158). The messaging module (160) then creates a data descriptor (710) that specifies a DMA transfer operation for transferring the application message (601) from the origin compute node (600) to the target compute node (604). The messaging module (160) also creates a completion notification descriptor (712) useful in notifying the application (158) that the transfer is complete according to embodiments of the present invention.

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in DMA transfer completion notification according to embodiments of the present invention may often provide messaging layer interfaces and also implement communications according to some aspects of the communication hardware layer (634). The exemplary DMA engine (197) of FIG. 6 includes an injection FIFO buffer (628) for storing data descriptors (618) that specify DMA transfer operations for transferring data. The data descriptors (618) of FIG. 6 stored in the injection FIFO buffer (628) may be regular data descriptors that specify messages to be sent to other DMA engines on other compute nodes or may be special completion notification descriptors that specify DMA data transfer operations carried out locally on the origin compute node to notify an application that a data transfer is complete. Although not shown, the exemplary DMA engine (197) of FIG. 6 also includes a number of reception FIFO buffers used to receive messages from other DMA engines on other compute nodes. Although FIG. 6 only illustrates a single injection FIFO buffer (628), readers will note that a DMA engine may have access to any number of injection FIFO buffers and reception FIFO buffers.

A memory FIFO data transfer operation is a mode of transferring data using DMA engines, typically a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using DMA engines, typically a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

In addition to specifying DMA data transfer operations, each data descriptor (618) of FIG. 6 also specifies one of the shared DMA counters (616) for use in the DMA transfer operation specified by the data descriptor (618). A shared DMA counter is a DMA counter that is utilized concurrently for multiple data transfer operations. That is, more than one descriptor (618) in the injection FIFO buffer (628) may specify the same counter (616). The use of shared DMA counters helps to avoid the problem of having to pend data transfers until a dedicated DMA counter is available to be assigned to a data descriptor (618) for use in a DMA transfer operation. Dedicated DMA counters for each data transfer operation may not always be available because of the limited number of DMA counters typically allocated to the DMA engine. In fact, in many system configurations, the DMA engine may only have access to sixty-four DMA counters.

In traditional systems, the DMA counters are dedicated to a single data transfer operation and are not shared concurrently among multiple data descriptors. Dedicated DMA counters are used by the origin compute node to identify when a data transfer is complete. The DMA engine uses a dedicated DMA counter associated with a particular data descriptor to track the amount of message data remaining to be send for that descriptor by setting the value of the counter to the size of the data to be transferred and decrementing the value of the counter as the data is transferred to the target compute node. Each DMA counter corresponds with a single bit in a counter status register (614). When the value of one of the counters reaches zero, the DMA engine sets the bit in the counter status register (614) that corresponds to the DMA counter that reached zero. When the processor polls the counter status register (614) and identifies that one of the bits in the counter status register (614) is set, the processor notifies the application initiating the data transfer that the data transfer is complete. The processor may poll the counter status register (614) periodically or in response to an interrupt generated by the DMA engine when a bit in the counter status register (614) is set.

As mentioned above, the DMA counters (616) used by the DMA engine (197) in the example of FIG. 6 are shared DMA counters and do not provide a way to track when a particular data transfer specified by a data descriptor is complete because a single shared DMA counter (616) may be utilized, and therefore decremented, for data transfer operations specified by multiple data descriptors. Because the shared DMA counters (616) in the example of FIG. 6 are not typically utilized to track the completion of a data transfer in systems capable of DMA transfer completion notification according to the present invention, the origin DMA engine (197) disregards values for the shared DMA counters (616). The origin DMA engine (197) disregards values for the shared DMA counters (616) by disabling a counter underflow interrupt that occurs when a counter reaches zero or simply not setting the bits in the counter status register (614) when a counter reaches zero.

The DMA engine (197) of FIG. 6 is capable of DMA transfer completion notification according to the present invention. The DMA engine (197) of FIG. 6 operates generally for DMA transfer completion notification according to embodiments of the present invention by: inserting, in an injection first-in-first-out ('FIFO') buffer (628), a data descriptor (710) for an application message (601) to be transferred to a target compute node (604) on behalf of the application (158) on the origin compute node (600); inserting a completion notification descriptor (712) in the injection FIFO buffer (628) after the data descriptor (710) for the application message (601), the completion notification descriptor (712) specifying a packet header for a completion notification packet; transferring, to the target compute node (604), the application message (601) in dependence upon the data descriptor (710); sending the completion notification packet to a local reception FIFO buffer using a local memory FIFO transfer operation; and notifying the application (158) that transfer of the application message (601) is complete in response to receiving the completion notification packet in the local reception FIFO buffer.

Figure 7:
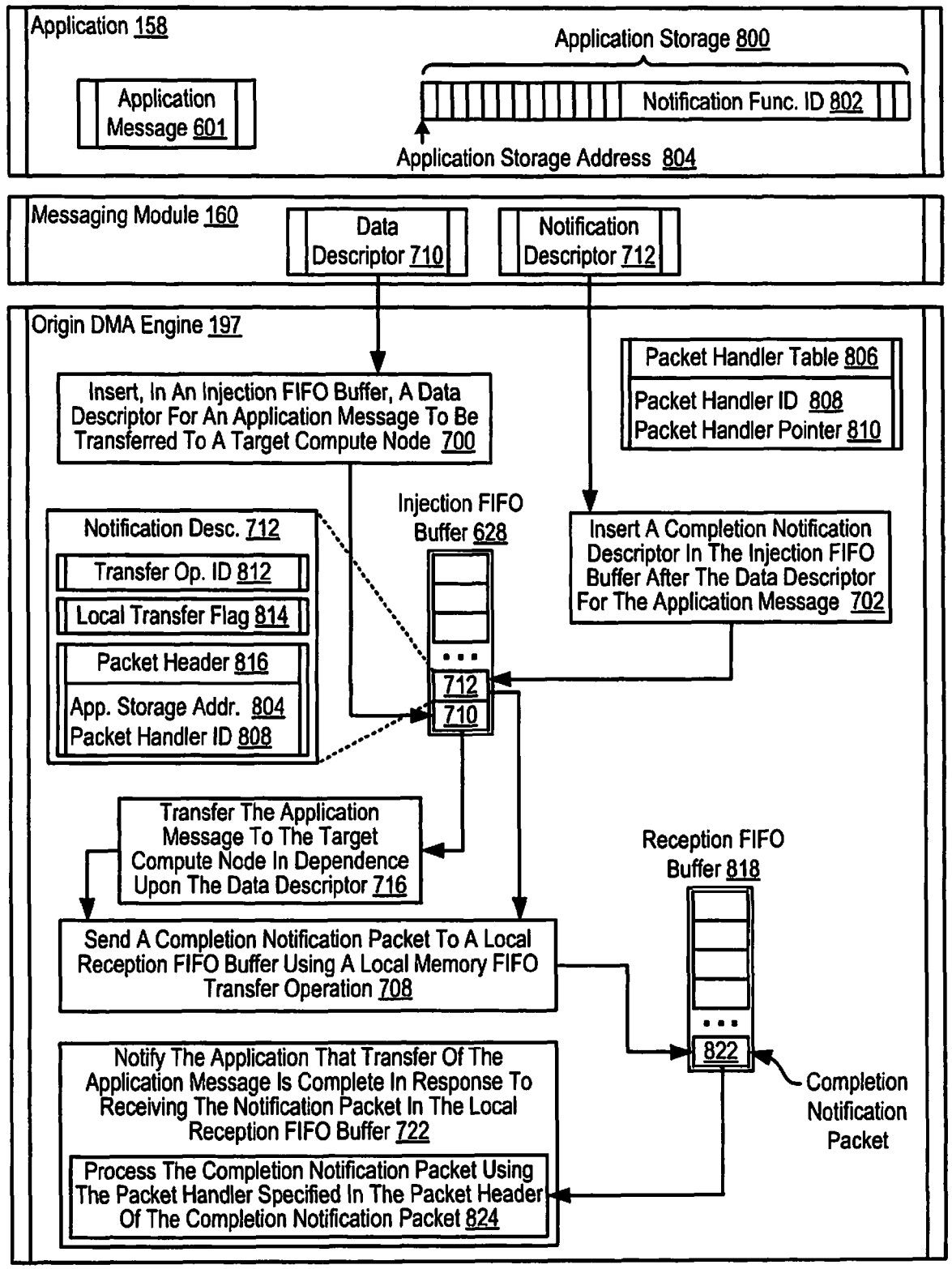
FIG. 7 sets forth a flow chart illustrating an exemplary method for DMA transfer completion notification according to the present invention.

For further explanation, FIG. 7 sets forth a flow chart illustrating an exemplary method for DMA transfer completion notification according to the present invention. The method of FIG. 7 includes inserting (700), by an origin DMA engine (197) on an origin compute node in an injection first-in-first-out ('FIFO') buffer (628), a data descriptor (710) for an application message (601) to be transferred to a target compute node on behalf of an application (158) on the origin compute node. The origin DMA engine (197) may insert (700) the data descriptor (710) in an injection FIFO buffer (628) according to the method of FIG. 7 by receiving the data descriptor (710) from a messaging module (160) on the origin compute node and storing the data descriptor (710) in the first available slot in the injection FIFO buffer (628). The messaging module (160) may create the data descriptor (710) in response to the application (158) calling a 'send' messaging function of the messaging module (160) to transmit the message (601) to the target compute node.

The method of FIG. 7 also includes inserting (702), by the origin DMA engine (197), a completion notification descriptor (712) in the injection FIFO buffer (628) after the data descriptor (710) for the application message (601). The origin DMA engine (197) may insert (702) a completion notification descriptor (712) in the injection FIFO buffer (628) according to the method of FIG. 7 by receiving the completion notification descriptor (712) from the messaging module (160) on the origin compute node and storing the completion notification descriptor (712) in the next slot of the injection FIFO buffer (628) after the slot containing the data descriptor (710).

The messaging module (160) may create the completion notification descriptor (712) when the messaging module (160) creates the data descriptor (710).

In the example of FIG. 7, the completion notification descriptor (712) specifies a packet header (816) for a completion notification packet (822) created when the origin DMA engine (197) processes the completion notification descriptor (712). The packet header (816) of FIG. 7 identifies application storage (800) on the origin compute node using an application storage address (804). The application storage (800), in turn, specifies an application notification function for the application (158) using a notification function identifier field (802) that stores the pointer to the application notification function used to notify the application that the data transfer is complete. That is, the application notification function specified by the notification function identifier field (802) operates as a callback function.

The packet header (816) of FIG. 7 also specifies a packet handler for executing the application notification function specified in the notification function identifier field (802). The packet header (816) specifies a packet handler using a packet handler identifier (808). The packet handler identifier (808) is associated with a pointer (810) to a packet handler in a packet handler table (806). The packet handler table (806) operates as a lookup table used by a DMA engine to call a particular packet handler capable of processing a particular packet received by the DMA engine. Using a packet handler identifier in a header of a particular packet, a DMA engine may lookup the pointer to the packet handler capable of processing the particular packet and may call the packet handler. When the packet is a completion notification packet, the packet handler identified in the packet header (816) calls the application notification function specified in the notification function identifier field (802) of application storage (800) beginning at application storage address (804).

The method of FIG. 7 includes transferring (716), by the origin DMA engine (197) to the target compute node, the application message (601) in dependence upon the data descriptor (710). The origin DMA engine (197) may transfer (716) the application message (601) to the target compute node according to the method of FIG. 7 by retrieving the application message (601) specified by the data descriptor (710), packetizing the application message (601) into network packets using the packet header specified in the data descriptor (710), and injecting the packets into the transmission stacks of the network adapter providing a network interface to the origin compute node.

The data descriptor (710) of FIG. 7 specifies a data transfer operation for transferring the application message to the target compute node. The data transfer operation may be implemented using, for example, a memory FIFO data transfer operation or a direct put data transfer operation. As mentioned above, a memory FIFO data transfer operation is a mode of transferring data using DMA engines, typically a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using DMA engines, typically a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

In the example of FIG. 7, the data descriptor (710) also specifies a shared DMA counter. As mentioned above, when using a shared DMA counter to process a data descriptor, the shared DMA counter does not indicate when transmission of the message specified by the data descriptor is complete because that same shared DMA counter is used concurrently by multiple DMA transfer operations. In the method of FIG. 7, therefore, transferring (716), by the origin DMA engine (197) to the target compute node, the application message (601) in dependence upon the data descriptor (710) may be carried out by disregarding a value for the shared DMA counter. The origin DMA engine (197) may disregard a value for the shared DMA counter by disabling the counter underflow interrupt that occurs when a DMA counter reaches zero or simply not setting the bits in the counter status register when a counter reaches zero. Disregarding a value for the shared DMA counter in such a manner advantageously conserves processing resource that would otherwise be consumed by polling a counter status register.

The method of FIG. 7 also includes sending (708), by the origin DMA engine (197), the completion notification packet (822) to a local reception FIFO buffer (818) using a local memory FIFO transfer operation. As mentioned above, a local memory FIFO transfer operation is a memory FIFO data transfer operation for which the origin compute node and the target compute node are the same compute node. That is, a compute node transfers data to itself in a local memory FIFO transfer operation. The origin DMA engine (197) may send (708) the completion notification packet (822) to a local reception FIFO buffer (818) according to the method of FIG. 7 by retrieving the packet header (816) from the completion notification descriptor (712) in the injection FIFO buffer (628), creating the completion notification packet (822) having the packet header (816), and transmitting the completion notification packet (822) to the reception FIFO buffer (818) using a local memory FIFO data transfer operation as specified by the completion notification descriptor (712). The completion notification descriptor (712) specifies the local memory FIFO data transfer operation using a transfer operation identifier (812) and a local transfer flag (814). The transfer operation identifier (812) is used to specify whether the particular data transfer operation is a memory FIFO transfer operation or a direct put transfer operation. The location transfer flag (814) indicates whether the data transfer operation is carried out locally such that the origin compute node and the target compute node for the operation are the same compute node. In the example of FIG. 7, the transfer operation identifier (812) specifies that the data transfer operation is a memory FIFO data transfer operation, and the local transfer flag (814) is set to indicate that the transfer is a local transfer.

Similarly to the data descriptor (710) of FIG. 7, the completion notification descriptor (712) of FIG. 7 also specifies a shared DMA counter. Because a shared DMA counter is used concurrently by multiple DMA transfer operations, the shared DMA counter does not indicate when transmission of the message specified by a particular data descriptor is complete. In the method of FIG. 7, therefore, sending (708), by the origin DMA engine (197), the completion notification packet (822) to a local reception FIFO buffer (818) using a local memory FIFO transfer operation may also be carried out by disregarding a value for the shared DMA counter. The origin DMA engine (197) may disregard a value for the shared DMA counter by disabling the counter underflow interrupt that occurs when a DMA counter reaches zero or simply not setting the bits in the counter status register when a counter reaches zero. As mentioned above, disregarding a value for the shared DMA counter in such a manner advantageously conserves processing resource that would otherwise be consumed by polling a counter status register.

The method of FIG. 7 includes notifying (722), by the origin DMA engine (197), the application (158) that transfer of the application message (601) is complete in response to receiving the completion notification packet (822) in the local reception FIFO buffer (818). The origin DMA engine (197) notifies (722) the application (158) that transfer of the application message (601) is complete according to the method of FIG. 7 by processing (824) the completion notification packet (822) using the packet handler specified in the packet header (816) of the completion notification packet (822). Upon receiving the completion notification packet (822) in the reception FIFO buffer (818), the origin DMA engine (197) may process (824) the completion notification packet (822) according to the method of FIG. 7 by calling the packet handler using the pointer (810) associated with the packet identifier (808) in the packet header (816). The packet handler, in turn, calls the application notification function specified in the notification function identifier field (802) of the application storage (800) beginning at the address (804). The packet handler locates the application storage address (804) from the packet header (816) of the completion notification packet (822). Readers will note that calling the application notification function advantageously notifies the application (158) that the data transfer of application message (601) is complete without having to wait for an acknowledgement message from the target compute node.

Exemplary embodiments of the present invention are described largely in the context of a fully functional computer system for DMA transfer completion notification. Readers of skill in the art will recognize, however, that the present invention also may be embodied in a computer program product disposed on computer readable media for use with any suitable data processing system. Such computer readable media may be recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for Direct Memory Access ('DMA') transfer completion notification, the method comprising:
    inserting, by an origin DMA engine on an origin compute node in an injection first-in-first-out ('FIFO') buffer, a data descriptor for an application message to be transferred to a target compute node on behalf of an application on the origin compute node;
    inserting, by the origin DMA engine, a completion notification descriptor in the injection FIFO buffer after the data descriptor for the application message, the completion notification descriptor specifying a packet header for a completion notification packet;
    transferring, by the origin DMA engine to the target compute node, the application message in dependence upon the data descriptor;
    sending, by the origin DMA engine, the completion notification packet to a local reception FIFO buffer using a local memory FIFO transfer operation; and
    notifying, by the origin DMA engine, the application that transfer of the application message is complete in response to receiving the completion notification packet in the local reception FIFO buffer.

2. The method of claim 1 wherein:
    the packet header identifies application storage on the origin compute node that specifies an application notification function for the application, the packet header specifying a packet handler for executing the application notification function; and
    notifying, by the origin DMA engine, the application that transfer of the application message is complete in response to receiving the notification packet in the local reception FIFO buffer further comprises processing the completion notification packet using the packet handler specified in the packet header of the completion notification packet.

3. The method of claim 1 wherein:
    inserting, by an origin DMA engine on an origin compute node in an injection FIFO buffer, a data descriptor for an application message further comprises receiving the data descriptor from a messaging module on the origin compute node; and
    inserting, by the origin DMA engine, a completion notification descriptor in the injection FIFO buffer alter the data descriptor for the application message further comprises receiving the completion notification descriptor from the messaging module on the origin compute node.

4. The method of claim 1 wherein:
    the data descriptor specifies a shared DMA counter; and
    transferring, by the origin DMA engine to the target compute node, the application message in dependence upon the data descriptor further comprises disregarding, by the origin DMA engine, a value for the shared DMA counter.

5. The method of claim 1 wherein:
    the completion notification descriptor specifies a shared DMA counter; and
    sending, by the origin DMA engine, the completion notification packet to a local reception FIFO buffer using a local memory FIFO transfer operation further comprises disregarding, by the origin DMA engine, a value for the shared DMA counter.

6. The method of claim 1 wherein the origin compute node and the target compute node are comprised in a parallel computer, the parallel computer comprising a plurality of compute nodes connected for data communications through a data communications network, the data communications network optimized for point to point data communications.

7. An origin compute node capable of Direct Memory Access ('DMA') transfer completion notification, the compute node comprising a DMA controller, an origin DMA engine installed upon the DMA controller, a computer processor, and computer memory operatively coupled to the computer processor, the DMA controller, and the origin DMA engine, the computer memory having disposed within it computer program instructions performing the steps of:

inserting, by an origin DMA engine on an origin compute node in an injection first-in-first-out ('FIFO') buffer, a data descriptor for an application message to be transferred to a target compute node on behalf of an application on the origin compute node;

inserting, by the origin DMA engine, a completion notification descriptor in the injection FIFO buffer after the data descriptor for the application message, the completion notification descriptor specifying a packet header for a completion notification packet;

transferring, by the origin DMA engine to the target compute node, the application message in dependence upon the data descriptor;

sending, by the origin DMA engine, the completion notification packet to a local reception FIFO buffer using a local memory FIFO transfer operation; and notifying, by the origin DMA engine, the application that transfer of the application message is complete in response to receiving the completion notification packet in the local reception FIFO buffer.

8. The origin compute node of claim 7 wherein:
the packet header identifies application storage on the origin compute node that specifies an application notification function for the application, the packet header specifying a packet handler for executing the application notification function; and notifying, by the origin DMA engine, the application that transfer of the application message is complete in response to receiving the notification packet in the local reception FIFO buffer further comprises processing the completion notification packet using the packet handler specified in the packet header of the completion notification packet.

9. The origin compute node of claim 7 wherein:
inserting, by an origin DMA engine on an origin compute node in an injection FIFO buffer, a data descriptor for an application message further comprises receiving the data descriptor from a messaging module on the origin compute node; and inserting, by the origin DMA engine, a completion notification descriptor in the injection FIFO buffer after the data descriptor for the application message further comprises receiving the completion notification descriptor from the messaging module on the origin compute node.

10. The origin compute node of claim 7 wherein:
the data descriptor specifies a shared DMA counter; and
transferring, by the origin DMA engine to the target compute node, the application message in dependence upon the data descriptor further comprises disregarding, by the origin DMA engine, a value for the shared DMA counter.

11. The origin compute node of claim 7 wherein:
the completion notification descriptor specifies a shared DMA counter; and
sending, by the origin DMA engine, the completion notification packet to a local reception FIFO buffer using a local memory FIFO transfer operation further comprises disregarding, by the origin DMA engine, a value for the shared DMA counter.

12. The origin compute node of claim 7 wherein the origin compute node and the target compute node are comprised in a parallel computer, the parallel computer comprising a plurality of compute nodes connected for data communications through a data communications network, the data communications network optimized for point to point data communication.

13. A computer program product for Direct Memory Access ('DMA') transfer completion notification, the computer program product disposed upon a computer readable medium, the computer program product comprising computer program instructions performing the steps of:

inserting, by an origin DMA engine on an origin compute node in an injection first-in-first-out ('FIFO') buffer, a data descriptor for an application message to be transferred to a target compute node on behalf of an application on the origin compute node;

inserting, by the origin DMA engine, a completion notification descriptor in the injection FIFO buffer after the data descriptor for the application message, the completion notification descriptor specifying a packet header for a completion notification packet;

transferring, by the origin DMA engine to the target compute node, the application message in dependence upon the data descriptor;

sending, by the origin DMA engine, the completion notification packet to a local reception FIFO buffer using a local memory FIFO transfer operation; and notifying, by the origin DMA engine, the application that transfer of the application message is complete in response to receiving the completion notification packet in the local reception FIFO buffer.

14. The computer program product of claim 13 wherein:
the packet header identifies application storage on the origin compute node that specifies an application notification function for the application, the packet header specifying a packet handler for executing the application notification function; and notifying, by the origin DMA engine, the application that transfer of the application message is complete in response to receiving the notification packet in the local reception FIFO buffer further comprises processing the completion notification packet using the packet handler specified in the packet header of the completion notification packet.

15. The computer program product of claim 13 wherein:
inserting, by an origin DMA engine on an origin compute node in an injection FIFO buffer, a data descriptor for an application message further comprises receiving the data descriptor from a messaging module on the origin compute node; and inserting, by the origin DMA engine, a completion notification descriptor in the injection FIFO buffer after the data descriptor for the application message further comprises receiving the completion notification descriptor from the messaging module on the origin compute node.

16. The computer program product of claim 13 wherein:
the data descriptor specifies a shared DMA counter; and
transferring, by the origin DMA engine to the target compute node, the application message in dependence upon the data descriptor further comprises disregarding, by the origin DMA engine, a value for the shared DMA counter.

17. The computer program product of claim 13 wherein:

the completion notification descriptor specifies a shared DMA counter; and sending, by the origin DMA engine, the completion notification packet to a local reception FIFO buffer using a local memory FIFO transfer operation further comprises disregarding, by the origin DMA engine, a value for the shared DMA counter.

18. The computer program product of claim 13 wherein the origin compute node and the target compute node arc comprised in a parallel computer, the parallel computer comprising a plurality of compute nodes connected for data communications through a data communications network, the data communications network optimized for point to point data communications.

* * * * *